UNITED STATES PATENT OFFICE.

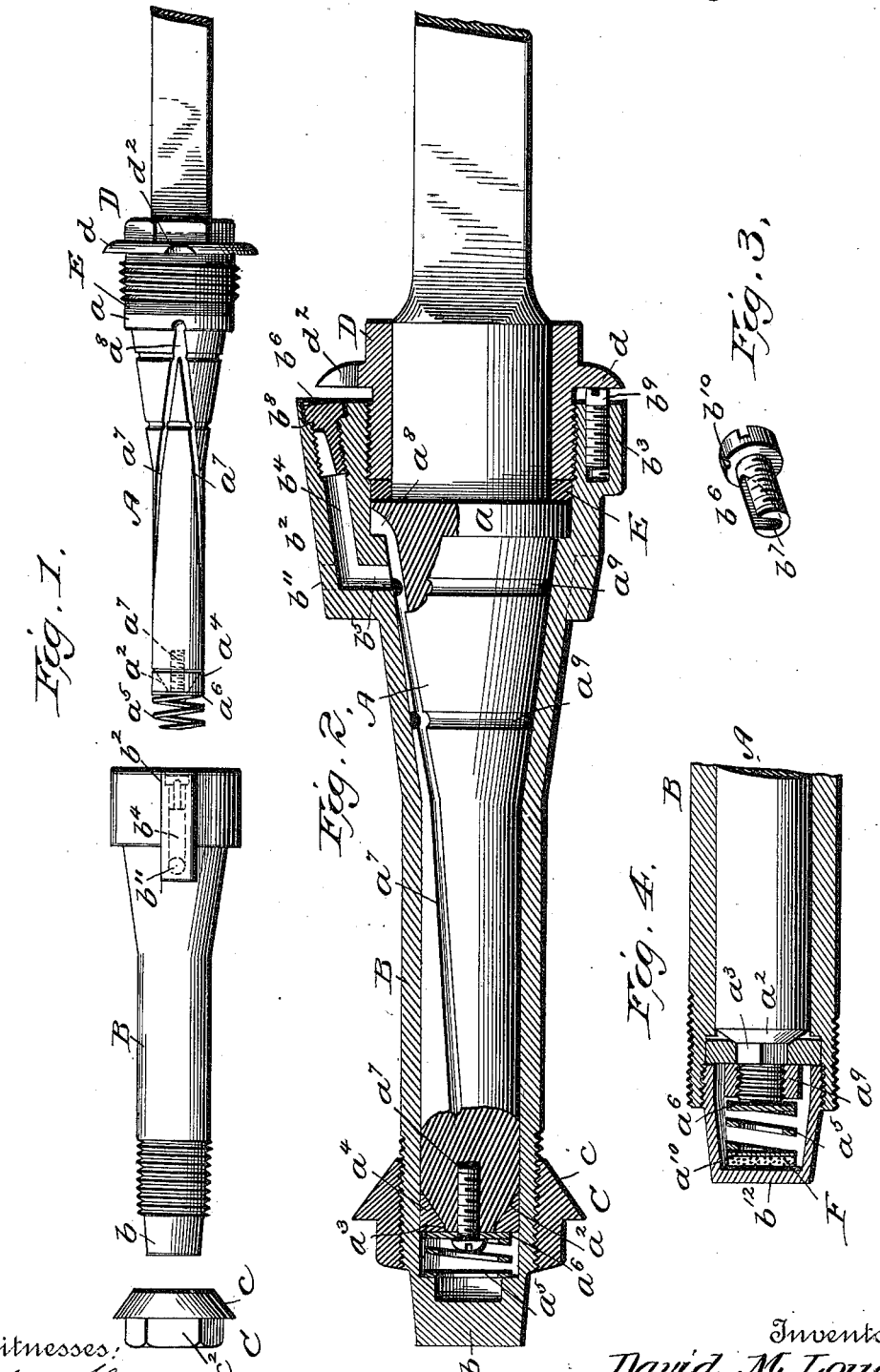

DAVID M. LOUCKS, OF JACOBUS, PENNSYLVANIA.

VEHICLE SPINDLE AND BOX.

SPECIFICATION forming part of Letters Patent No. 566,200, dated August 18, 1896.

Application filed December 13, 1895. Serial No. 572,020. (No model.)

*To all whom it may concern:*

Be it known that I, DAVID M. LOUCKS, a citizen of the United States, residing at Jacobus, in the county of York and State of Pennsylvania, have invented certain new and useful Improvements in Vehicle Spindles and Boxes; and I do hereby declare the following to be a full, clear, and exact description of the invention, such as will enable others skilled in the art to which it appertains to make and use the same.

This invention relates to vehicle spindles and boxes.

The objects are to take up all end thrust and thereby prevent any rattling of the spindle in the box; to provide a novel form of oil-groove for supplying and distributing oil throughout the length of the spindle and box; to provide a box in which the outer end thereof constitutes the finish, thereby dispensing with the employment of the nut or cap commonly employed for this purpose; to provide means for taking up any lost motion of the box when placed within the hub and also for centralizing or holding the box therein; to provide a novel form of screw for directing the supply of oil from the exterior of the box to the channels of the spindle and to act as a closure to prevent entrance of dust to the spindle; to provide means for adjusting the sand-band with relation to the box or to the hub, and, finally, to provide a simple cheaply-constructed box and spindle for vehicles, as will hereinafter fully appear.

In the accompanying drawings, forming a part of this specification and in which like letters of reference indicate corresponding parts, I have illustrated a form of embodiment of my invention with a modification thereof, although other forms of embodiment thereof may be employed without departing from the spirit of the same.

In the drawings, Figure 1 is a view in plan, showing the respective parts of the box and spindle separated and in position to be assembled. Fig. 2 is a view in side elevation and partly in section, showing the parts of the box and spindle assembled. Fig. 4 is a sectional detail view of a modification, illustrating a change in the construction of the outer portion of the spindle and the box. Fig. 3 is a detached detail view of the screw for closing the oil-duct in the box.

Referring to the drawings, A designates the spindle, constructed in this instance of a series of cones, which taper progressively from the butting-ring $a$ outward to the end of the spindle. The end portion of the spindle is sharply tapered at $a^2$ and terminates in a teat or projection $a^3$, and on the tapered portion and the teat is placed a revoluble collar $a^4$, which constitutes an abutment against which bears one end of a spring $a^5$, the other end thereof bearing against the inner portion of the end of the box B. As shown, the spring is attached to a plate $a^6$, through which passes a screw $a^7$ into the end of the spindle for holding the spring in place; but it is to be understood that, if desired, the spring may be secured directly to the collar $a^4$ and thereby render the employment of the plate unnecessary. The function of the collar is to permit the spring to rotate with the box and thus prevent wear of the spring.

Cut into the upper surface of the spindle are channels $a^7$, which branch from a channel $a^8$ in the butting-ring $a$ and extend outward and downward to the end of the spindle, the angle of inclination of these grooves or channels with relation to the long diameter of the spindle being such that their terminal points are in line with the axis of the spindle. By thus disposing the channels the oil is fed evenly throughout the length of the spindle and box, and is held in place in the channels for a longer time than would be possible if the channels were sharply inclined from the butting-ring and terminated below the axis of the spindle. In addition to the channels $a^7$ there are a plurality of circumferential channels $a^9$ at the end portion of the spindle which operate to distribute the oil thoroughly and evenly to the largest part of the spindle and box, at which point there is the greatest strain and consequently greatest wear.

The box B is chambered interiorly to fit the contour of the spindle, and is provided at its small end with a smoothly-dressed portion $b$, which constitutes the finish of the box and takes the place of the ordinary cap or nut usually employed for covering the end of the spindle. Back of this smooth portion the box is threaded for a distance, and on these threads works a nut C, one face of which, the inner face in use, is formed or provided with a cone $c$, the function of which is to hold the hub on the box and also to centralize the box in the hub and compensate for wear or lost motion of the box when secured within the hub-opening, the outer face of the nut being cut to form a plurality of faces $c^2$ to be engaged by a wrench for turning the nut to its seat within the hub. The large or inner end of the box is provided with two oppositely-disposed hollow lugs or splines $b^2$ $b^3$, which are designed to engage mortises in the hub to hold the box from turning therein. The bore $b^4$ of the lug $b^2$ constitutes an oil-duct, forming a continuation of an opening $b^5$, formed in the inner wall of the box, this opening $b^5$ being directly over the channel $a^8$ in the butting-ring, so that oil fed into the bore $b^4$ will immediately flow to the spindle, and, by the channels therein, be distributed throughout its entire length. In order to close the bore $b^4$ against the entrance of dust and also to facilitate the lubricating of the spindle, a longitudinally-recessed screw $b^6$ is employed, the recess or slot $b^7$ of which extends from the end to a point near the head, which latter, by bearing against a circumferential shoulder $b^8$ in the bore $b^4$, prevents the entrance of extraneous matter to the spindle. If desired, a washer may be placed between the head of the screw and the shoulder $b^8$.

The lug $b^3$ contains an adjusting-screw $b^9$, against which bears the sand-band $d$ of a combined sand-band and spindle-adjusting nut or collar D, mounted on the axle-bar back of the butting-ring $a$ and separated therefrom by a packing-ring or gasket E, of any suitable material. The sand-band is of a diameter sufficient to cover the screw $b^9$ and partially to cover the screw $b^6$, by which arrangement these screws will be held from working out when the spindle and box are in use. In order to permit of the turning of the screw $b^6$ for the purpose of supplying oil to the spindle, or of the screw $b^9$ for the purpose of adjusting the spindle with relation to the box, the sand-band is provided with a recess $d^2$, which, when brought opposite either of the screws, will admit of their being turned or removed. To facilitate the correct feeding of the oil to the spindle, the screw is provided with an indicating-nick $b^{10}$, which indicates when the slot $b^7$ is up or in proper position to feed oil to the channels of the spindle.

In some instances it may be desired to feed the oil into the top of the lug $b^2$ instead of into the end, as just described. To accomplish this, the lug is provided in its upper face with an opening $b^{11}$, (indicated by dotted lines in Figs. 1 and 2,) this opening being in communication with an opening in the hub, (not shown,) this latter opening being closed by a spring-pressed lid, a screw, or a plug. When this opening $b^{11}$ is used, the screw $b^6$ will fit within it and operate in the manner already described.

In Fig. 4 I have shown a modification of spindle and box adapted more particularly for use in connection with heavy vehicles. In this construction the teat $a^3$, next to the inclined or tapered portion $a^2$, is angular or other than round in cross-section, and on this part is mounted the collar $a^4$, which is held in place by a nut $a^9$, the teat being in part threaded for this purpose. The exterior surface of the end of the box is threaded for the reception of the cone-faced nut C and the interior surface for the reception of a cap $b^{12}$, which latter constitutes the finish to the box. The spring $a^5$, which is interposed between the end of the spindle and the cap $b^{12}$, carries a plate $a^6$, as described in connection with Figs. 1 and 2, and a second plate $a^{10}$, between which and the end of the cap is interposed a suitable packing F, of cork, wood, or other light or fibrous material, the function of which is to shield the plate $a^{10}$ from wear. If desired, the spring may, in some instances, be dispensed with, but ordinarily it is preferred to use it. The remaining parts of the spindle and box are the same as before described, and therefore need neither illustration nor explanation.

Having thus fully described my invention, what I claim as new, and desire to secure by Letters Patent, is—

1. The combination of a spindle, a box inclosing the same, a revoluble collar mounted on the end of the spindle, and a spring interposed between the end of the spindle and the collar, substantially as described.

2. The combination of a spindle, a box inclosing the same, a revoluble collar mounted on the end of the spindle, and a spring bearing against the collar and the end of the box, substantially as described.

3. The combination of a box, a spindle fitting therein and having its outer end reduced, a revoluble collar mounted on this reduced portion, and a spring interposed between the end of the spindle and the collar, substantially as described.

4. The combination with a box having its outer end closed and constituting the finish to the box, of a spindle fitting within the box, and a spring interposed between the end of the spindle and the end of the box and projecting within the closed, finished end of the box, substantially as described.

5. A spindle having its upper surface provided with oil grooves or channels diverging from or near the butting-ring outward to the end of the spindle, the inclination or dip of these channels with relation to the long diameter of the spindle being such that their terminals are in line with the axis of the spindle, whereby the oil is fed evenly throughout the length of the spindle and box, and is retained in place in the channels against too rapid escape, substantially as described.

6. The combination with a spindle having its upper surface provided with oil grooves or channels diverging from or near the butting-ring outward to the end of the spindle, the inclination or dip of these channels with relation to the long diameter of the spindle being such that their terminals are in line with the axis of the spindle, of a box having its inner portion provided with an oil-duct communicating with the channels in the spindle, and a screw within the duct to close the same, and also to direct the flow of oil to the spindle, substantially as described.

7. The combination with a box exteriorly threaded at one end and provided with oppositely-disposed lugs at the other end, one lug being provided with an oiling-screw and the other with an adjusting-screw, a sand-band having a recess to permit of either screw being turned, and a cone-faced nut engaging the threaded portion of the box and operating to seat the lugs in the hub and centralize the box therein; substantially as described.

In testimony whereof I affix signature in presence of two witnesses.

DAVID M. LOUCKS.

Witnesses:
R. G. DYRENFORTH,
R. M. ELLIOTT.

It is hereby certified that in Letters Patent No. 566,200, granted August 18, 1896, upon the application of David M. Loucks, of Jacobus, Pennsylvania, for an improvement in "Vehicle Spindles and Boxes," errors appear in the printed specification requiring correction as follows: On page 1, lines 48-51, the sentence "Fig. 4 is a sectional detail view of a modification, illustrating a change in the construction of the outer portion of the spindle and the box," should be stricken out and inserted after the period, line 53, same page, as now numbered; and lines 103 and 113, page 2, the word "collar" should read *box;* and that the said Letters Patent should be read with this correction therein that the same may conform to the record of the case in the Patent Office.

Signed, countersigned, and sealed this 25th day of August, A. D., 1896.

[SEAL.]

JNO. M. REYNOLDS,
*Assistant Secretary of the Interior.*

Countersigned:
S. T. FISHER,
*Acting Commissioner of Patents.*